United States Patent [19]

Yauk

[11] 4,451,993
[45] Jun. 5, 1984

[54] SLIDING RULE AND PROTRACTOR

[76] Inventor: Alvin R. Yauk, P.O. Box 43, Gate, Okla. 73844

[21] Appl. No.: 511,071

[22] Filed: Jul. 5, 1983

[51] Int. Cl.³ .............................................. B43L 7/06
[52] U.S. Cl. .................................. 33/472; 33/464; 33/495; 33/451
[58] Field of Search .................... 33/495–500, 33/470–473, 419, 425–427, 451, 460, 461, 464, 161, 478

[56] References Cited

U.S. PATENT DOCUMENTS

| 1,021,850 | 4/1912 | Shakely | 33/478 |
| 1,190,941 | 7/1916 | Needham | 33/427 |
| 1,255,158 | 2/1918 | Gronager | 33/419 |
| 1,514,323 | 11/1924 | Kirchner | 33/460 |
| 1,636,637 | 7/1927 | Hutchison | 33/473 X |
| 2,658,278 | 11/1953 | Debs | 33/473 |

Primary Examiner—Harry N. Haroian
Attorney, Agent, or Firm—Robert K. Rhea

[57] ABSTRACT

An extensible rule and protractor formed by an equally dimensioned pair of superposed strap members, having indicia thereon, secured together by a screw projecting through one member and sidably received by a longitudinal slot in the other member. Guide pins, on one member entering longitudinal grooves on the other member, maintain the members in longitudinal alignment when one member is sidably moved longitudinally relative to the other. A circular groove intersecting the longitudinal grooves at one end portion slidably receive the pins permitting angular rotation of one member with respect to the other to measure and define a selected angular position.

2 Claims, 5 Drawing Figures

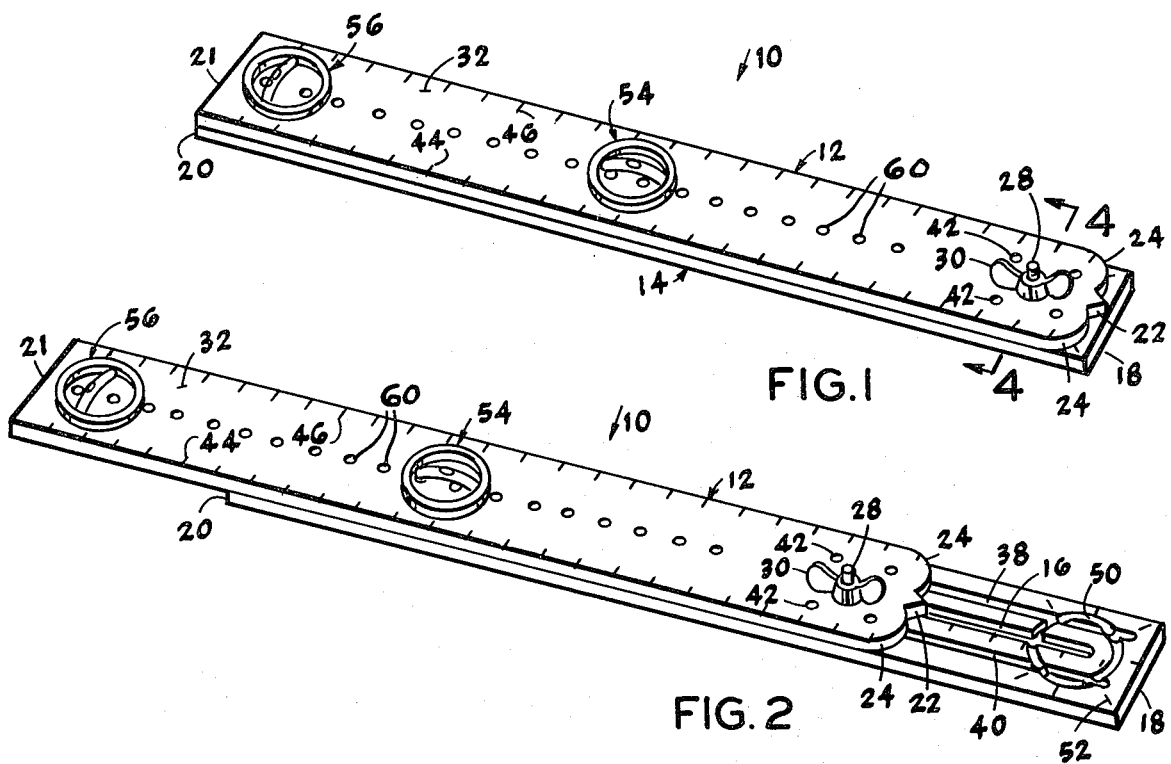
FIG.1
FIG.2
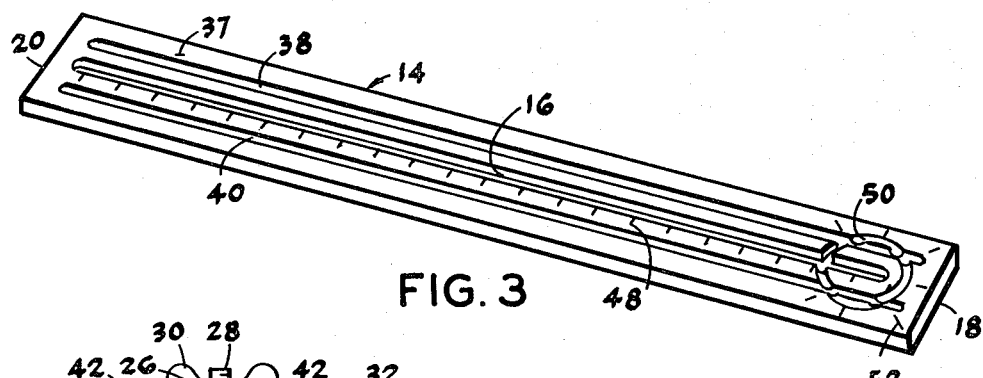
FIG.3
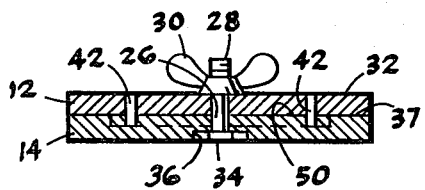
FIG.4
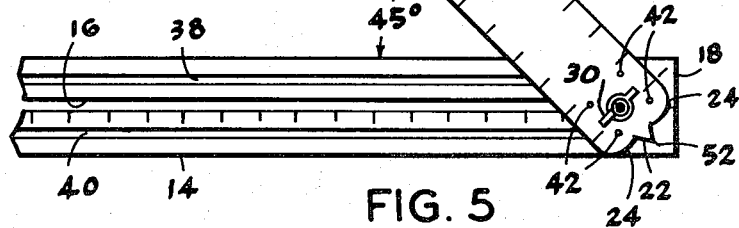
FIG.5

SLIDING RULE AND PROTRACTOR

BACKGROUND OF THE INVENTION

1. Field of the Invention

The present invention relates to carpenters tools and more particularly to a combination level, extensible straight edge and protractor.

2. Description of the Prior Art.

Prior patents generally disclose extensible rules in which one member slidably overlies another member for longitudinal movement of one member with respect to the other in which indicia, on the respective members, indicate the combined measurement. Some extensible rules have lateral projections in which the respective member forms a caliper-like device for measuring external dimensions while other patents disclose an arcuate lateral sector in which one of the members is hinged to the other for disposing the members to define a selected angle.

This invention is distinctive over prior patents by providing a pair of members longitudinally slidable relative to each other which are maintained in a sliding relation by a thumb screw bolt extending through one member and slidable in a slot in the other member wherein guide pins maintain the members in aligned relation and a circular groove, at one end of the slot containing member, permits selected angular positioning of the two members to form a protractor.

SUMMARY OF THE INVENTION

An arcuate straight edge base member is provided with a central longitudinal slot terminating adjacent its respective ends. A top straight edge member of equal dimensions with respect to the base longitudinally and pivotally overlies the base and is secured thereto by a thumb screw and bolt extending through the top member adjacent one of its ends and slidably engaging the base member slot. A plurality of circumferentially equally spaced guide pins depend from the top member and slidably enter upwardly open grooves formed in the upper surface of the base member on opposing sides of its longitudinal slot. Equally spaced indicia is scored on lateral marginal edge surfaces of the top member for length measurement. Similarly, equally spaced indicia is longitudinally scored on the upper surface of the base member which cooperates with the indicia on the top member to indicate the overall length between respective ends of the members as a unit when the top member is longitudinally displaced relative to the base member. Similarly, degree indicia scored on the base member, indicates, in combination with a pointer on the top member, angular relationship of the members when the top member is pivoted relative to the base member.

The principal objects of the invention are to provide an improved combination extensible rule, level and protractor which is simple in construction and may be folded to a relatively compact size and which will indicate the inside measurement between two members.

BRIEF DESCRIPTION OF THE DRAWINGS

FIG. 1 is a perspective view of the tool in folded position;

FIG. 2 is a view similar to FIG. 1 illustrating the rule in partially extended position;

FIG. 3 is a perspective view of the base member, per se;

FIG. 4 is a vertical cross sectional view, to a larger scale, taken substantially along the line 4—4 of FIG. 1; and, FIG. 5 is a fragmentary top view illustrating the top and bottom members in protractor relation.

DESCRIPTION OF THE PREFERRED EMBODIMENTS

Like characters of reference designate like parts in those figures of the drawings in which they occur.

In the drawings:

The reference numeral 10 indicates the tool, as a whole, which is rectangular strap-like in general configuration formed by a top member 12 overlying a base member 14 equally dimensioned with respect to the top member. The base 14 is provided with a longitudinal slot 16 medially its width and terminating adjacent its respective parallel ends 18 and 20. One end 21 of the top 12 is squared with respect to its longitudinal sides and its opposite end is provided with an indictor or pointer 22 formed by cutting away a portion of its end surface, as at 24, to define the central arrow-like pointer 22 normally disposed in alignment with the base end 18 when the tool is in the position of FIG. 1 for the purposes presently explained.

Adjacent its end 24 the top is apertured vertically medially its width, as at 26, for receiving a bolt 28 with a thumb screw nut 30 overlying the upper surface 32 of the top. The bolt 28 is slidably received by the base slot 16 and the head 34 of the bolt is nested by a groove 36 in the bottom surface of the base coextensive with the slot 16. The upper surface 37 of the base is further provided with a pair of parallel longitudinally extending upwardly open grooves 38 and 40 respectively spaced outwardly of the slot 16 and terminating adjacent the respective ends 18 and 20 of the base.

The top 12 is provided with a plurality, four in the example shown, of pins 42 circumferentially and radially equally spaced with respect to its thumb screw aperture 26 which depend from the bottom surface of the top and are slidably received by the base grooves 38 and 40. The purpose of the pins 42 and the grooves 38 and 40 is to maintain the top and base longitudinally aligned when the top is moved relative to the base.

The upper surface of the top 12 is provided, adjacent its marginal edges, with a pair of scales or indicia 44 and 46, indicating the length of the top 12 from either of its ends. The base 14 is similarly provided with a longitudinally extending series of indicia 48 beginning at its end 18 and cooperating with one of the scales on the top to indicate the total length of the two members, between the ends 18 and 21, when the top is displaced relative to the base, as for example, when measuring the inside dimension between door jambs, or the like.

The upper surface of the base is further provided with a circular groove 50, preferably having a diameter slightly greater than the distance between the base grooves 38 and 40 and utilizing the end of the slot 16 adjacent the base end 18 as its center. The circular groove 50 is of equal depth with respect to and intersects the grooves 38 and 40 and slidably receives the depending end portion of the pins 42. With the top and base members in the position of FIG. 1, the top may be angularly rotated relative to the base about the axis of the bolt 28 by the pins 42 following the circular groove 50 to form a protractor. The upper surface 37 of the base is provided, outwardly of the circular groove 50, with radially spaced degree indicia 52 indicating the angular relation between the top 12 and base, as for example, a 45° position (FIG. 5). To select a desired angle the top pointer is disposed in overlying relation on the selected angular indicia.

The top 12 is further provided with a pair of spirit levels 54 and 56 intermediate its ends and adjacent one end, respectively, for the purposes believed apparent.

Operation

Operation seems obvious and briefly stated, when measuring a length greater than the overall length of the top member the thumb screw nut 30 is loosened and the top moved relative to the base to a measured distance or desired overall length, indicated by the indicia 48 on the base and the thumb screw tightened, if desired, to maintain the setting.

When used as a protractor the top and base is disposed in the position of FIG. 1 and with the thumb screw loosened the top is angularly rotated relative to the base to measure a desired angle or set to a desired angle and the thumb screw tightened. Additionally, any one of a series of central longitudinally equally spaced holes 60, formed in the top 12, may be used to scribe a circle.

Obviously the invention is susceptible to changes or alterations without defeating its practicability. Therefore, I do not wish to be confined to the preferred embodiment shown in the drawings and described herein.

I claim:

1. A measuring tool, comprising;
    an elongated right rectangular planar base member having an upper surface and having a central longitudinally extending slot terminating adjacent its respective ends;
    an elongated top member of equal length and width with respect to said base member and having an aperture adjacent one end vertically aligned with the base member slot;
    screw means pivotally securing the top member on the base member,
    said base member having at least one longitudinal groove between its slot and one longitudinal marginal edge open toward said top member; and,
    at least one pin depending from said top member and slidably received by the groove for maintaining said members longitudinally aligned during longitudinal movement of one member relative to the other member,
    one end portion of said base member having a circular groove open toward said top member formed on a radius at least equal to the spacing between the longitudinal groove and the slot and intersecting the longitudinal groove for sliding movement of said pin through the circular groove during pivoting movement of said top member relative to said base member.

2. The tool according to claim 1 in which cooperating length measurement indicia is stored on at least one planar surface of said top and base member, respectively, and degree indicating indicia is scored on said base member outwardly of the circular groove and further including:
    pointer means including an arrow-like projection centrally formed on one end surface of said top member for indicating the extended or radial position of said top member on said base member.

* * * * *